United States Patent [19]
Itakura et al.

[11] 3,877,666
[45] Apr. 15, 1975

[54] METHOD FOR THE CONTINUOUS DETECTION OF VEHICLE POSITION

[75] Inventors: Eiji Itakura, Koganei; Toshiaki Sasaki, Tokyo, both of Japan

[73] Assignee: Japanese National Railways, Tokyo, Japan

[22] Filed: Feb. 7, 1974

[21] Appl. No.: 440,479

[30] Foreign Application Priority Data
Feb. 7, 1973 Japan.................................. 48-14615

[52] U.S. Cl. .......................... 246/122 R; 246/187 B
[51] Int. Cl. ............................................. B61l 25/00
[58] Field of Search ............ 246/122 R, 124, 182 B, 246/187 B, 63 C, 8; 179/82; 340/23

[56] References Cited
UNITED STATES PATENTS

| | | | |
|---|---|---|---|
| 3,740,549 | 6/1973 | Thorne-Booth.................. | 246/122 R |
| 3,786,411 | 1/1974 | Kurauchi .............................. | 179/82 |

FOREIGN PATENTS OR APPLICATIONS

| | | | |
|---|---|---|---|
| 1,074,602 | 7/1967 | United Kingdom............. | 246/187 B |

*Primary Examiner*—Lloyd L. King
*Assistant Examiner*—Reinhard J. Eisenzopf
*Attorney, Agent, or Firm*—Armstrong, Nikaido & Wegner

[57] ABSTRACT

The present invention relates to a method for the continuous detection of vehicle position, by which the position of a moving railway vehicle can be continuously detected.

The vehicle is equipped with a transmitter that can transmit, through an antenna, a high frequency magnetic field at a constant frequency and amplitude. On the group a plurality of induction lines are laid in the travel direction of the vehicle. The induction lines have a plurality of nodal points of transposition at equal intervals in the travel direction of the vehicle. The inter-nodal distance on each induction line is the same and all these induction lines are so laid that the nodal points on each line are staggered by a certain distance from nodal points on the other lines in the travel direction of the vehicle. Thus, if the number of induction lines laid is $n$, the nodal points on these lines will successively staggered by an inter-nodal distance of $1l(n-1)/n$.

The antenna on the vehicle and the induction lines on the ground are laid out parallel to each other in the horizontal direction with a predetermined separation from each other so that they are electromagnetically coupled.

The signal applied by the vehicle to each of the induction lines is a sine wave with a wavelength equal to twice the internodal distance.

The received voltages induced in all the induction lines except one are shifted in phase by $180° \times (n-1)/n$ in the minus and plus directions. Then the induced voltage on the unshifted induction line and $n-1$ induced voltages phase-shifted in the minus direction are added together, while the induced voltage on the unshifted induction line and $n-1$ induced voltages phase-shifted in the plus direction are added together. Thus by measuring the phase difference between these two synthetic waves the position of the vehicle can be continuously detected.

4 Claims, 51 Drawing Figures

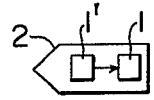
FIG. 1
PRIOR ART
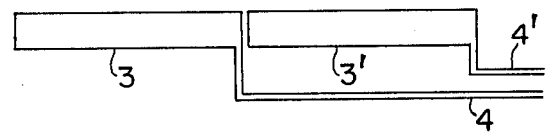
FIG. 2
PRIOR ART
FIG. 3(a)
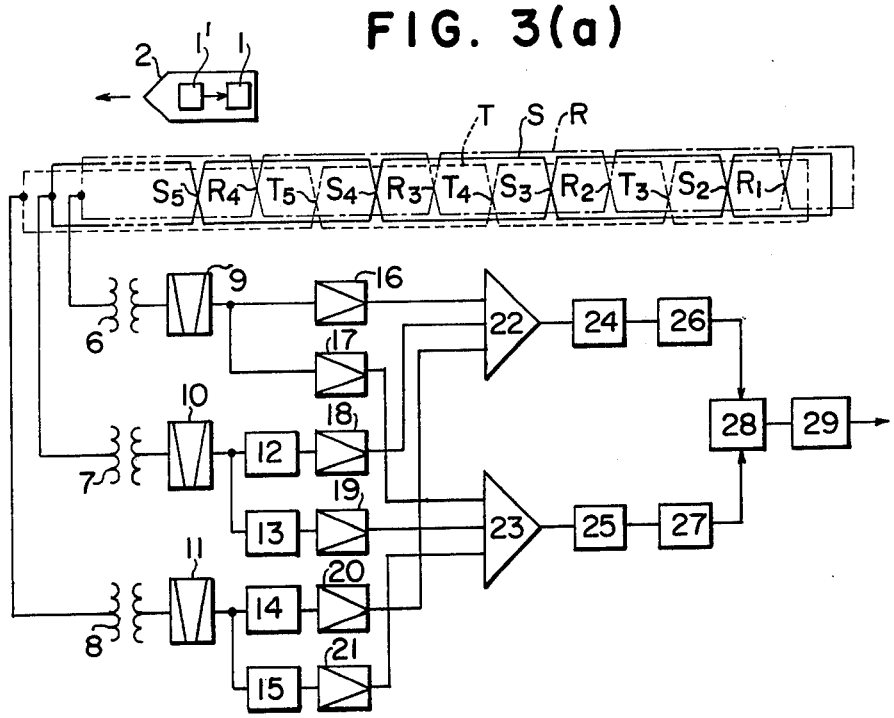

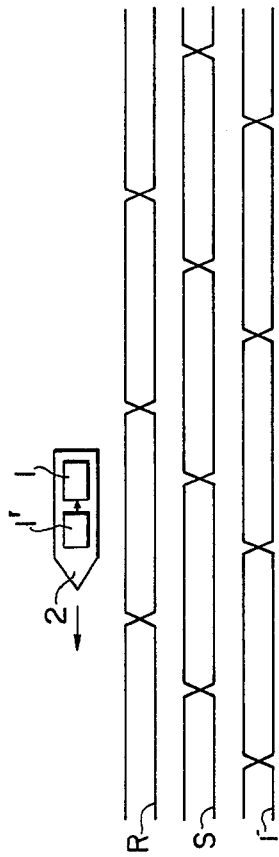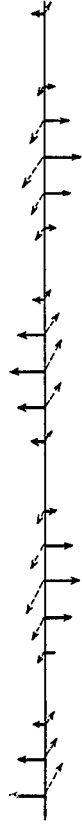
FIG. 3(b)
FIG. 3(c)
FIG. 3(d)
FIG. 3(e)
FIG. 3(f)

METHOD FOR THE CONTINUOUS DETECTION OF VEHICLE POSITION

BACKGROUND OF THE INVENTION

It is generally admitted that detection of the running vehicle position is indispensable for automatic control or safety control of railway trains. The conventional train position detection of this kind is mainly intended for the block system to secure the mutual safety of trains preceding and succeeding. For example, in accordance with information on vehicle position, instructions for operation of the vehicle are given to railway signals and thereby safety can be ensured between a preceding train and a suceeding train. The time taken by a vehicle run from one detection point to another is counted; by dividing the distance between the two detection points by the running time thus counted, the running speed between said two detection points is found; and by comparing this speed with the reference running speed, the speed of the vehicle can be controlled. In this case, the shorter the distance between these two detection points, the more accurate can be speed control. The object will be virtually attained by the present method for train position detection to be described later.

In recent times, linear motorized drive systems have been proposed for superspeed operation of vehicles. Under this system the linear motor is automatically driven depending on vehicle position information, thereby, reliable detection of exact train position is essential to control the linear motor. Particularly in the dc type or synchronous type linear motor drive system the train position must be detected at invervals of several meters to several tens of centimeters; and considering the variable speed of the train, the detection must be fine and precise. Thus, train position detection has come to acquire an additional object of supplying drive power.

For the purpose of detecting the position of a moving vehicle by the train-oriented communications facilities on the ground, a method to be described in conjunction with FIGS. 1 and 2 is wellknown in the prior art. This method is constituted as follows.

The vehicle is equipped with a transmitter to issue its position signal, which is transmitted through an antenna to the ground. On the ground are laid induction lines in the travel direction of the vehicle. The induction lines represent loop channels of specified longitudinal length separately laid out sucessively with a certain gap in the travel direction of the vehicle or loop channels wherein nodal points for detection of train position are set such that the interval between them can be equal. In the former case, the vehicle transmits a signal to the loop channel over which it is located by inducing a voltage therein.

In the latter case, when the antenna happens to be at a nodal point, the voltage drops close to zero and this signifies that the vehicle has passed the nodal point of zero induced voltage.

This conventional method can indicate on which loop channel or between what nodal points the vehicle is located, but cannot indicate exactly where the vehicle is on that loop channel or exactly where the vehicle is between these two nodal points.

If in the latter case of using induction lines the interval between two adjacent nodal points is made shorter, the train position will be detected by that much more exactly, however, there is a limit to this improvement of detection; if the inter-nodal distance becomes shorter than the antenna length, the detection of train position by interruption of the position will become impossible.

SUMMARY OF THE INVENTION

The vehicle of the present invention is equipped with a transmitter which transmits through an antenna a high frequency magnetic field at a constant frequency and amplitude. On the ground are laid a plurality of induction lines in the travel direction of the vehicle. The introduction lines contain nodal points of transportation at equal intervals in the travel direction of the vehicle. The inter-nodal distance on each induction line is the same and the induction lines are laid in the travel direction of the train such that the nodal points on them are staggered by a specified interval. Thus, if the number of induction lines laid is $n$, the nodal points on said lines will be successively staggered by the inter-nodal distance $l(n-1)/n$. As the vehicle progresses, a signal transmitted from the vehicle through the antenna induces a voltage in the form of a sine wave with a wavelength twice as long as the inter-nodal distance. The induced voltage in all the induction lines except one are shifted in phase by $180°(n-1)/n$ in respectively the minus and the plus direction. Then the induced voltage in the unshifted line and $(n-1)$ induced voltages phase-shifted in the minus direction are added together while the induced voltage in the unshifted line and $(n-1)$ induced voltages phase-shifted in the plus direction are added together. By measuring the phase difference between these two synthetic waves, the vehicle position can be continuously detected.

In another embodiment, the induction line comprises paired transposed loop channels with a wide parallel portion in the travel direction and loop channels with a narrow parallel portion alternately connected. The loop with a wide parallel portion and the loop with a short narrow parallel portion have the same length in the travel direction of the vehicle. And said wide parallel portion in one loop constituting the induction line and said narrow parallel porition in the other loop are oppositely disposed in the travel direction of the vehicle. The center of said narrow parallel portion in the travel direction of the vehicle falls on the nodal point of transposition. Thus are a plurality of induction lines thus constituted laid out in the travel direction of the vehicle. Nodal points on each induction line are disposed successively with a stagger of $n-1/n$ $l$ ($n$ is the number of induction lines laid; $l$ is the distance between a nodal point on one loop constituting one induction line and a nodal point adjacent to said nodal point in the travel direction of vehicle on the other loop). Voltages received from a pair of loop channels constituting an induction synthesized with a reverse polarity to each other; thereafter the output of a frequency oscillator separately provided is modulated by the synthesized output. The modulated output originating from all induction lines except one are phase-shifted in either the plus direction or the minus direction. The non-shifted modulated output originating from the one excepted line and the modulated outputs originating from the other lines which have been phase-shifted, say, in the plus direction are added together. By measuring the phase difference between this synthetic wave and the

3 output from said frequency oscillator, the vehicle position can be continuously detected.

BRIEF DESCRIPTION OF THE DRAWINGS

FIG. 1 is an explanatory diagram illustrating one conventional technique for detecting the vehicle position.

FIG. 2 is an explanatory diagram illustrating another conventional technique for detecting the vehicle position.

DESCRIPTION OF THE PREFERRED EMBODIMENT

Figure 3G:
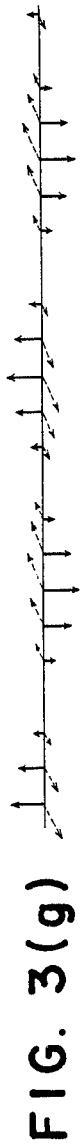
FIG. 3(c) to (l) and (n) to (p) are wave form patterns explaining the function of the embodiment illustrated in FIGS. 3(a) and (b).

FIGS. 1 and 2 illustrate some methods for the same purpose well known in the prior art.

In FIGS. 1, 3 and 3' are loop channels of flat rectangular shape. The loop channels 3 and 3' are identical in both the longitudinal and the transverse lengths. They are laid out, say, between rails, such that their longitudinal axis is parallel to the travel direction of vehicle. Opposite ends of said loop channels 3 and 3' are respectively connected through the transmission lines 4 and 4' to a central station. Meanwhile, the vehicle 2 is equipped with a vehicle position detecting signal transmitter 1' which issues a vehicle detecting signal through the antenna 1. The antenna 1 is so installed that an electromagnetic coupling of signal can take place between said antenna and induction lines 3, 3', laid on the ground. Thus, with the movement of the antenna 1 aboard a moving vehicle, the vehicle position signal transmitted from the antenna 1 causes a voltage to be induced in the induction lines 3, 3'. For instance, when the antenna 1 comes over the induction line 3', the vehicle position signal transmitted from the antenna 1 causes a voltage to be induced in the induction line 3', said voltage being transmitted over the transmission line 4' to the central station. With progress of the train as the antenna 1 leaves the induction line 3' and comes over the induction line 3, the induced voltage in the line 3' vanishes and instead a voltage is induced in the line 3, this voltage being transmitted over the line 4 to the central control station. Thereby the central control station is informed as to which induction line the vehicle is passing.

In FIG. 2, another example of train position detection in the prior art is shown. The induction lines 5, 5' in FIG. 2 are composed of rectangular loop channels with nodal points of transposition 51–53 and 51'–53' equally spaced. When the antenna 1 comes over one nodal point of transposition, say, at 51, induced currents expressed by, say, arrows $b$, $b'$ appear. At 51, the induced currents are mutually opposite in polarity so that they substantially cancel each other; and in consequence the voltage induced at nodal point 51 is extremely low as compared with the voltage in other parts of the induction line. Every time the antenna 1 passes the nodal point as it moves together with the vehicle, the zero induced voltage is transmitted over the lines 41, 41' to the central station. Therefore, by counting the number of nodal point passages, the vehicle position can be detected.

Suppose the vehicle begins to move from the right extreme of the induction line 5' in FIG. 2 and the count of nodal point passages is five. Then it is known that the antenna 1 of the vehicle is located somewhere between the nodal positions 53 and 52 in FIG. 2.

In the former method of vehicle position detection in the prior art, however, it may be possible to know that the vehicle exists on the induction lines 3, 3', but impossible to know exactly where on these lines the vehicle exists. Similarly in the latter case it may be possible to know that the vehicle exists somewhere between certain nodal points but impossible to know exactly where between them. If in the latter case, the inter-nodal distance is made as small as possible, the vehicle position detection can be by that much more precise. However, an inter-nodal distance smaller than the antenna length will render it impossible to detect the vehicle position by interruption of the voltage induction or by inversion of phase. The above-mentioned methods of prior art can be said to be the discontinuous detection of train position.

The present invention, accomplished with the intention to eliminate the drawback to the conventional methods of train detection, has as its objective to provide a continuous method for detection of vehicle position characterized by being able to make a continuous, exact detection of the position of a moving vehicle.

The present invention is to be described referring to its embodiments illustrated in FIGS. 3(a) to 7(i).

FIGS. 3(a) and (b) show sets of induction lines R, S, T positioned on the ground. The induction lines R, S, T are the same as the induction line 5 or 5' in FIG. 2; that is, they are composed of loop channels transposed at equal intervals with nodal points at $R_1 - R_4$, $S_2 - S_5$ and $T_3 - T_5$. The inter-nodal distances $R_1 - R_2$, $R_2 - R_3$, $R_3 - R_4$, $S_2 - S_3$, $S_3 - S_4$, $S_4 - S_5$, $T_3 - T_4$ and $T_4 - T_5$, are the same, being equal to $l$. Each induction line is disposed such that, for instance, the nodal point $S_2$, on the induction line S staggered by $1/3l$ from nodal point $R_1$, on the induction line R, while the nodal point $T_3$, on the induction line T is staggered by $1/3l$ from the nodal point $S_2$, on the induction line S, in the travel direction of the vehicle. The induction lines R-T may be disposed in an overlapping relation as illustrated in FIG. 3(a), or they may be disposed parallel to the travel direction of the vehicle with a defininte separation from one another, as illustrated in FIG 3(b). The important consideration is that the train position signal, transmitted through the antenna on board the vehicle, can induce a voltage in each of the induction lines R-T. the induction line R is connected through the matching transformer 6 and the bandpass filter 9 to the parallel circuit of the amplifier 16 and 17. The outputs of the amplifiers 16 and 17 are connected respectively to the inputs of known analog add circuits, 22, 23. Meanwhile the induction line S is connected through the matching transformer 7 and the bandpass filter 10 to the parallel circuit of the phase-shifter 12 and amplifier 18 and the phase-shifter 13, and amplifier 19. The outputs of the amplifiers 18, 19 are connected respectively to the circuits 22, 23. Likewise the induction line T is connected through the matching transformer 8 and the bandpass filter 11 to the parallel circuit of the phase-shifter 14 and amplifier 20 and the phase-shifter 15, and amplifier 21. The output of the amplifiers 20, 21 are connected respectively to the input sides of add circuits 22 and 23. The output side of the add circuit 22 is connected through the rectangular wave converter 24 and the rise detection circuit 26 to the set side of a known flip-flop circuit 28; and the output side of the add circuit 23 is connected through the rectangular wave converter 25 and rise detection circuit 27 to the reset side of the flip-flop circuit 28. The output of said flip-flop circuit 28 is connected to a known smoothing circuit 29.

Under such arrangement, for instance in the case of the induction line R, as the on-board antenna 1 comes closer to the nodal point $R_1$, the signal receiving level drops and when the antenna center is over the nodal point $R_1$, the signal receiving level becomes substantially equal to zero. Thereafter with movement of the antenna the signal receiving level rises again, but with the phase inverted, it grows, and when the antenna center reaches the next nodal point $R_2$, the signal receiving level becomes zero again. Thus, the received voltage in the induction line with progress of the antenna 1 can be expressed as a pattern of sine wave form with the distance between two nodal points as one half cycle. The received voltage of the sine waveform, however, is supposed to be affected by the profile, size of the onboard antenna and the separation of the antenna from the induction line. To confirm this supposition, the present inventor has made an experiment, in which a rectangular loop antenna 55 cm long in the longitudinal direction of vehicle and 15 cm wide was used; the induction line, 18cm wide in the longitudinal direction with an inter-nodal 90cm was laid such that the separation of the antenna from this induction line might be 60cm through said antenna, a 100 KHZ signal was transmitted, resulting in a pattern of sine wave as illustrated in FIG. 4, in which the ordinate is the normalized received voltage (V) of the induction line and the abscissa is the distance (cm) of midpoint of antenna from the nodal point.

Figure 4:
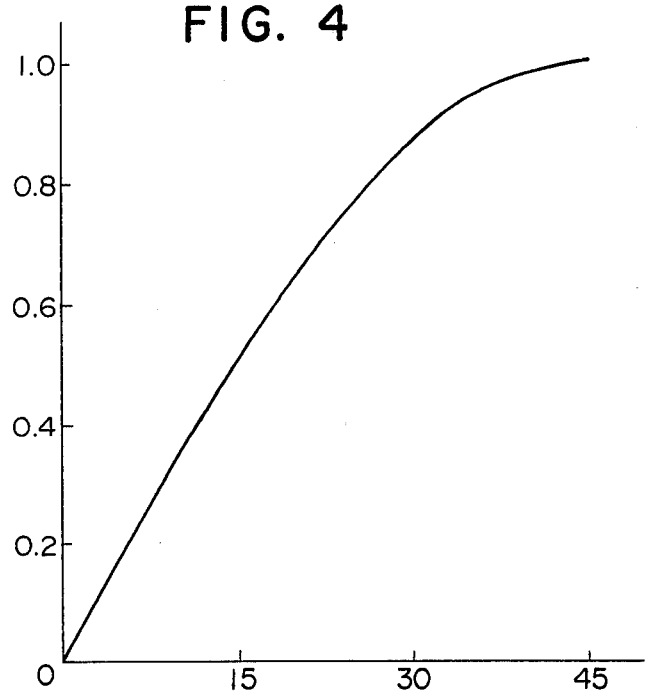
FIG. 4 is a pattern illustrating the induced voltage produced in the induction line of the present invention.

It is apparent from FIG. 4 that when the antenna, the induction line and their relation are set as above, a voltage of such a sine waveform is received with progress of the antenna. Also it has been known from subsequent experiments carried out by the present inventor that antenna length in the travel direction of vehicle is most desirably equal to about 0.55–0.7 of the inter-nodal distance on the induction line. When the antenna length deviates from this value, due to a certain irregularity error of 2–3% occurs on the detection of the train position by the present invention, but application is possible for use where an error of such extent may be disregarded.

If the profile, size of the on-board antenna 1 shown in FIG 3(a) and its separation from the induction lines R-T are set as mentioned above, an induced voltage with vectors as illustrated in FIG. 3(c) will develop in the receiving terminal of the induction line R, induced voltage as illustrated by the solid line in FIG. 3(d) will develop in the receiving terminal of the induction line S, and induced voltage as illustrated by the solid line in FIG. 3(e) will develop in the receiving terminal of the induction line T, respectively referring to the position of the induction lines R,S,T as illustrated in FIG. 3(b).

If it is so adjusted that the maximum reception in each induction line may be come equal to $V_o$, the instantaneous value of the received voltage at the antenna position $x$ may be approximated in the induction line R, where the magnitude of the received voltage changes in a sine waveform with a cycle of $2l$ ($l$ is the inter-nodal distance) by;

$$V_r = V_o \ [\cos(\frac{\pi}{l}x) \times \cos w\ t \ . \ . \ . \ .] \qquad (1)$$

and in the induction line S, where the received voltage change is two thirds ($l$) advanced to the induction line R, by;

$$V_s = V_o\ [\cos(\frac{\pi}{l}x + \tfrac{2}{3}\pi)\cos w\ t \ . \ . \ . \ .] \qquad (2)$$

and in the induction line T, where the received voltage change is four thirds $l$ advanced relative to the induction line R, by;

$$V_t = V_o\ [\cos(\frac{\pi}{l}x + \frac{4}{3}\pi)\cos w\ t] \ . \ . \ . \ . \qquad (3)$$

where $l$ is the distance between two adjoining nodal points on each induction line; $w$ is the angular frequency of the transmitted signal, and $t$ is the time when the train position signal is detected.

Figure 3H:
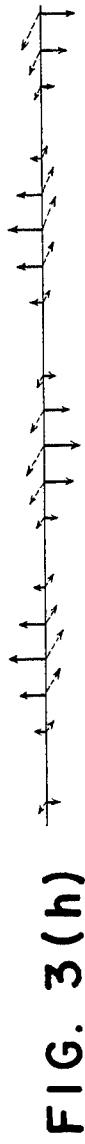

The induced voltage $V_s$ of the induction line S goes through the matching transformer 7 to the phase-shifters 12, 13, where the induced voltage $V_s$ is shifted in phases by $-120°$ and $+120°$ respectively. The output with its vectors as indicated by the dotted lines in FIG. 3(g) from the phase-shifter 12 is applied through the amplifier 18 to the add circuit 22, while from the phase-shifter 13 the output with its vectors indicated by the dotted line in FIG. 3(d) is applied through the amplifier 19 to the add circuit 23. The induced voltage $V_t$ of the induction line T is applied through the matching transformer 8 and the bandpass filter 11 to the phase-shifters 14, 15. The induced voltage $V_t$ is phase-shifted by $-240°$ in the phase-shifter 14 and by $+240°$ in the phase-shifter 15; and from the phase-shifter 14 the output with its vectors as indicated by the dotted line in FIG. 3(h) is applied through the amplifier 20 the the add circuit 22, while from the phase-shifter 15 the output with its vectors as indicated by the dotted line in FIG. 3(e) is applied through the amplifier 21 to the add circuit 23. The induced voltage of the induction line R without being phase-shifted goes through the matching transformer 6 and the band-pass filter 9 and is applied respectively through the amplifiers 16 and 17 to the add circuits 22 and 23.

Thus, the add circuit 22 receives a $-120°$ phase-shifted voltage of the induction line S, a $-240°$ phase-shifted voltage of the induction line T, and a non-phase-shifted voltage of the induction line R; and these voltages are added together to produce a vector as indicated by Va in FIG. 3(f).

Figure 3I:
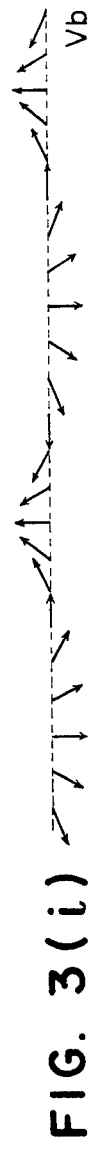

On the other hand, the add circuit 23 receives a $+120°$ phase-shifted voltage of the induction line S, a $+240°$ phase-shifted voltage of the induction line T, and a non-phase-shifted voltage of the induction line R; and these voltages are added together to produce a vector as indicated by Vb in FIG. 3(i).

Figure 3J:
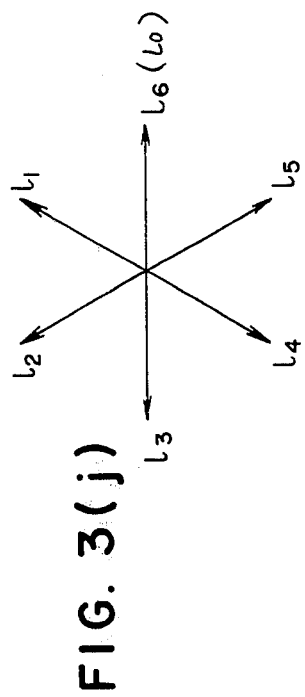
Figure 3K:
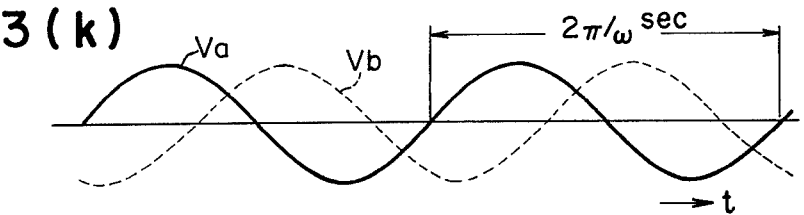
Figure 3L:
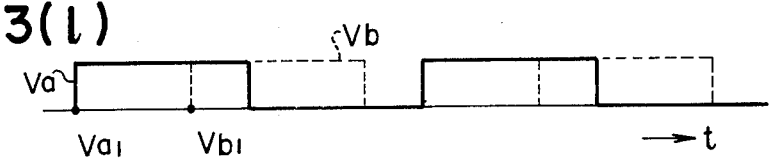

The output Vb from the add circuit 23 substantially appears in a waveform as indicated by Vb in FIG. 3(k), while the output from the add circuit 22 likewise appears in a waveform as indicated by Va in FIG. 3(k). The output Vb is no other than the output whose phase angle, though the voltage value stays unchanged, changes from 0° to $-360°$ as illustrated in FIG. 3(j), when the antenna travels two internodal distances (2$l$), namely it moves from $l_6$ to $l_o$ in FIG. 3(j). Likewise said output Va can be expressed as a waveform, whose phase angle successively shifts from 0° to $+360°$, though the voltage value remains constant, when two inter-nodal distance (2$l$), that is, $l_o$ to $l_6$ is covered. This may be proved even by the following numeriexpression.

Namely, replacing wt with wt $-$ ⅔ $\pi$ in the above expression (2) with wt with wt $-$ 4/3 $\pi$ in the expression (3), the output Va, that is, the sum of $Vr_1$, $Vs_1$ and $Vt_1$ phase has only to be found. Here, $Vr_1$ is the non-phase-shifted voltage of induction line R, $Vs_1$ being the $-120°$ phase-shifted voltage of induction line S, $Vt_1$ being the $-240°$ phase-shifted voltage of the induction line T. Then the instantaneous value Va can be given by $$Va = Vr + Vs + Vt$$
$$= V_o \cos \frac{\pi}{l} x \cos wt + V_o \cos \left( \frac{\pi}{l} x + \frac{2}{3}\pi \right) \cos \left( wt - \frac{2}{3}\pi \right)$$
$$+ V_o \cos \left( \frac{\pi}{l} x + \frac{4}{3}\pi \right) \cos \left( wt - \frac{4}{3}\pi \right)$$
$$= \frac{3}{2} V_o \cos \left( wt + \frac{\pi}{l} x \right) \qquad (4)$$

Thus it is known that, the amplitude of the output Va is constant, the phase being proportional to the vehicle position, i.e., to the antenna position $x$.

Likewise, the instantaneous value Vb is found using the same (4) in the above and is given as;

$$Vb = 3/2 \, V_o \cos (wt - \pi/lx) \qquad (5)$$

Vb and Va are the same in that their phase is proportional to the vehicle position $x$ and it changes with a cycle of 2$l$ but the difference between them is that whereas the phase of Va is in the increasing direction, that of Vb is in the decreasing direction. Accordingly, by measuring the phase difference between Va and Vb, a momentary position of the vehicle can be detected.

The output Va of the add circuit 22 and the output Vb of the add circuit 23 in FIG. 3(k) are respectively converted in known shaping circuits 24 and 25 to rectangular waves as illustrated in FIG. 3(1); and then they are applied to detection circuits 26 and 27, where the rise point $Va_1$ of the output Va and the rise point $Vb_1$ of the output Vb are detected. The rise detection circuit 26 and 27 can be, as shown in FIG. 3(m), the combination of a known differentiation circuit 261 and a known half-wave rectification circuit 262. For instance, the output Va of the add circuit 22 is given as a rectangular wave as illustrated in FIG. 3(n) to the differentiation circuit 261.

Figure 3M:
FIG. 3(m) show the deteiles of the rise detection circuit in FIG. 3(a).
Figure 3N:
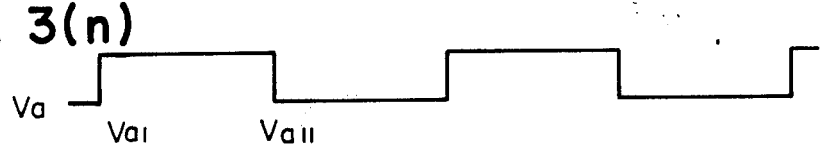
FIG. 3(a) shows the whole circuit of one embodiment of the present invention.
FIG. 3(b) is a plan view showing another arrangement of induction lines in FIG. 3(a).
FIG. 3(q) is a diagram illustrating the principle of continuously detecting the train position in accordance with the present invention.
Figure 3O:
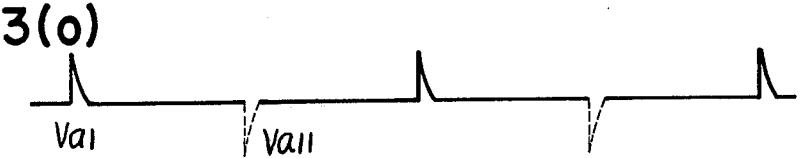
Figure 3P:
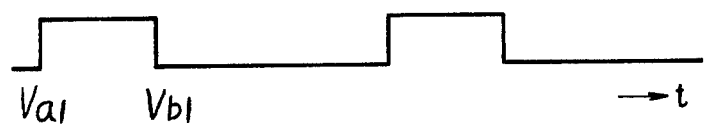
Figure 3Q:
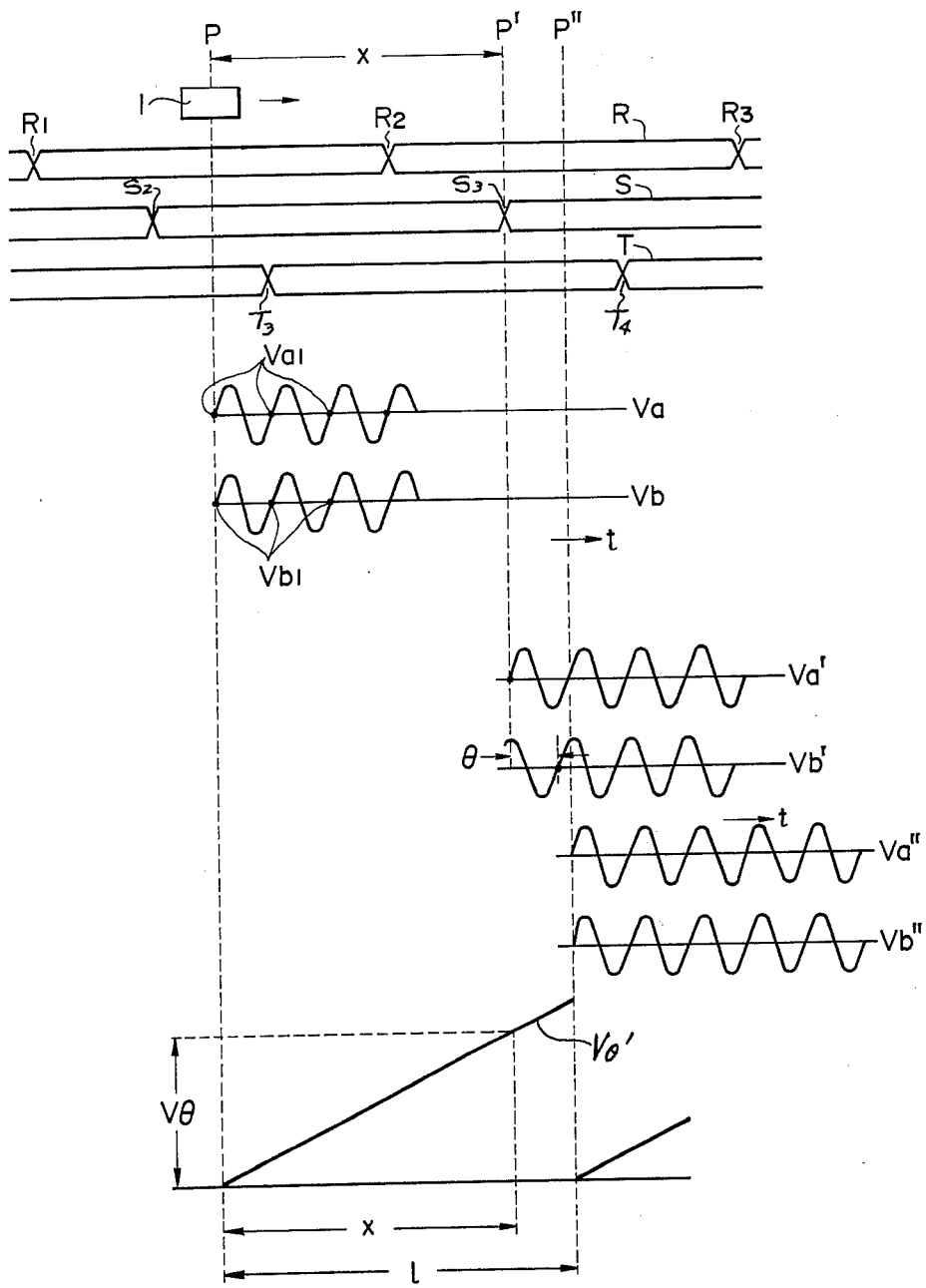

By the known system, as shown in FIG. 3(o) the differentiation circuit 261 detects the rise points $Va_1$ and fall point $Va_{11}$ of the rectangular wave Va and give them to the half-wave rectification circuit 262, where the fall point $Va_{11}$ is eliminated from the points detected by the differentiation circuit 261. Thus it is possible for only the rise point of said point Va to be given from the half-wave rectification circuit 262 to the flip-flop circuit 28. Also it is possible for only the rise point $Vb_1$ of the output Vb of the add circuit 23 to be given to the flip-flop circuit 28 through a differentiation circuit and a half-wave rectification circuit of the same composition, The $Va_1$ detection signal from the rise detection circuit 26 is applied as a set signal to the flip-flop circuit 28, while the $Vb_1$ detection signal from the rise detection circuit 27 is applied as a reset signal to the flip-flop circuit 28. As the result, an output corresponding to the phase difference between Va and Vb develops as shown in FIG. 3(p) in the flop-flop circuit 28. The phase-difference output is converted to a voltage value in a known smoothing circuit 29. To give a more detailed account of this point referring to FIG. 3(q), R, S, T in FIG. 3(q) are identical with the induction lines shown in FIG. 3(a) or (b), $R_1 - R_3$ being the nodal point on the induction line R, $S_2$ and $S_3$ being the nodal points on the induction line S, $T_3$ and $T_4$ being the nodal points on the induction lines T, and 1 being the antenna. The antenna 1 is assumed to travel in the arrow direction with progress of vehicle. P, P'' are respectively lines normal to the induction lines R, S, T, which pass the midpoints between the nodal points $R_1$ and $R_2$ and between $R_2$ and $R_3$.

As seen from the above, when the center of the antenna 1 which travels in the direction of vehicle progress comes over the midpoint P between the nodal points $R_1$ and $R_2$ on the induction line R, the phase-difference between the output Va and Vb is zero. But as the antenna 1 moves in the arrow direction, the phase difference between Va and Vb is gradually enlarged; and when its center in the direction of vehicle progress reaches, say, the point P', the outputs Va and Vb become Va' and Vb'. In this state there is a phase difference θ between Va' and Vb'. This phase difference between Va' and Vb' reaches a maximum just before the antenna 1 reaches the point P'' and then abruptly drops to zero.

Thus, by converting the change in said phase difference to a d-c voltage value in the known smoothening circuit 29 of FIG. 3(a), a voltage curve Vθ' as shown in FIG. 3(q) can be obtained. Namely, as the antenna 1 moves from the midpoint between $R_1$ and $R_2$ on the line R to the midpoint between $R_2$ and $R_3$, the voltage value Vθ steadily increases; it attains a maximum just short of the point P'' and then the phase difference drops suddenly to zero, as indicated by Va'' and Vb''. In this case, the internodal distance $l$ is preset, while the maximum value of Vθ can be arbitrarily set. Therefore by measuring an instantaneous value of Vθ, it can be known where between P and P'' the antenna 1 exists. As the antenna 1 moves with the progress of the vehicle, said difference is continuously detected and thereby the momentary position of a running train can be found.

Figure 5A:
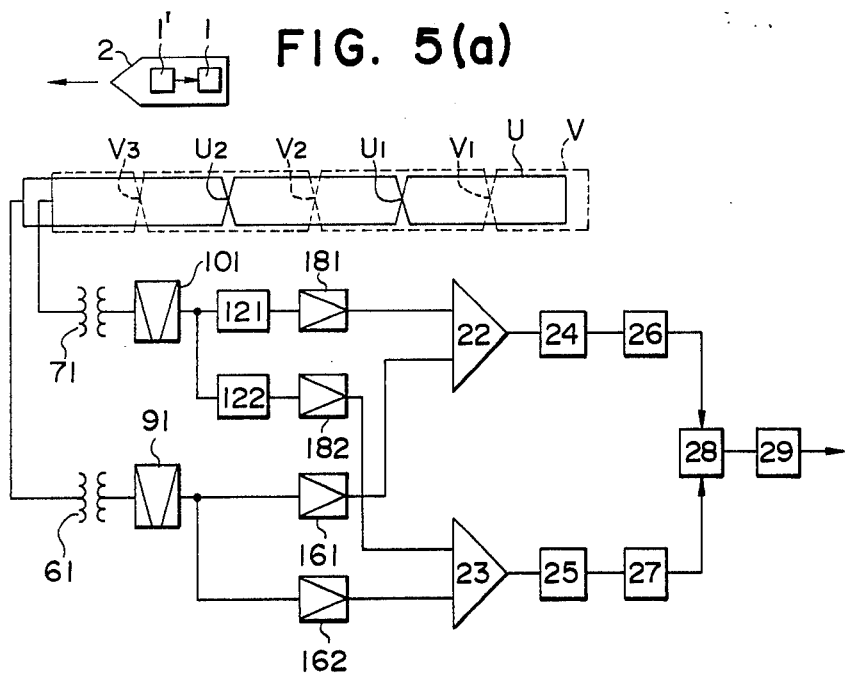
FIG. 5(a) shows the whole circuit of another embodiment of the present invention.

FIG. 5(a) illustrates another embodiment of the present invention. This is a case of two sets induction lines U, V being laid out in the travel direction of the vehicle. The configuration of the induction lines U, V are same as that of the induction line shown in FIG. 3(a), except that the nodal point $U_1$ of the induction line U is staggered by one-half of the inter-nodal distance from nodal point $V_1$ of the induction line V in the travel direction of the vehicle.

The induced voltage Vu of the induction line U is applied through the matching transformer 61, the bandpass filter 91 and respectively through the amplifiers 161, 162 to the add circuits 22, 23. Meanwhile, the induced voltage Vv of the induction line V is applied through the matching transformer 71 to the bandpass filter 101; then after being shifted in phase by −90° in the phase-shifter 121, it is applied through the amplifier 181 to the add circuit 22, and after being shifted in phased by +90° in the phase-shifter 122, it is applied through the amplifier 182 to the add circuit 23.

Figure 5B:
FIGS. 5(b) to (i) are wave form patterns explaining the function of the embodiment illustrated in FIG. 5(a).
Figure 5C:
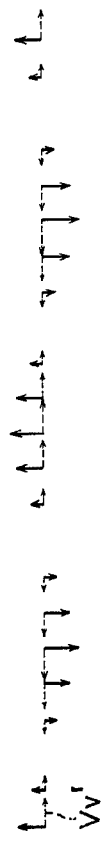
Figure 5D:
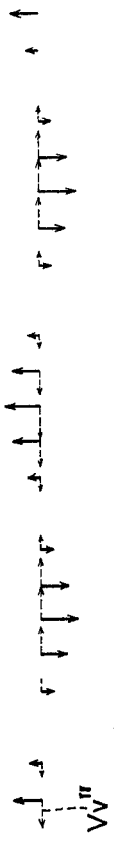

In FIG. 5(b) a vector diagram of the induced voltage Vu in the induction line U is shown, while in FIG. 5(c) a vector of the induced voltage Vv in the induction line V is shown by a solid line. The vector of the induced voltage of the induction line Vv after phase shift of −90° is given as Vv' in FIG. 5(c). while the vector of the induced voltage of the induction line V after phase shift of +90° is given as Vv'' in FIG. 5(d).

Figure 5E:
Figure 5F:

As stated above, in the add circuit 22 the non-phase-shifted induced voltage of the induction line U and the −90° phase-shifted inducted voltage of the induction line v are added tobether to produce an output waveform with vectors Vc as illustrated in FIG. 5(e). similarly, in the add circuit 23, the non-shifted induced voltage of the induction line u and the +90° phase-shifted induced voltage of the induction line V are added together to produce vectors Vd as illustrated in FIG. 5(f).

Figure 5G:
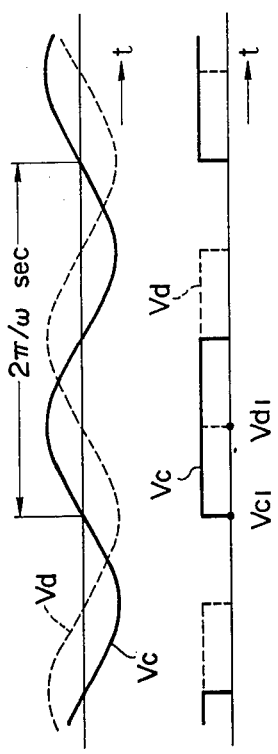
Figure 5H:
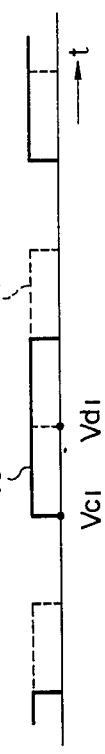
Figure 5I:

Actually, the outputs appear as a waveform as illustrated in FIG. 5(g); and respective outputs Vc, Vd, after being shaped to rectangular waves as illustrated in FIG. 5(h) in the rectangular wave shaping circuits 24 and 25, are applied to the rise detection circuit 26 and 27; and in the same way as shown in FIG. 3(m) −(q), the phase difference between Vc, and Vd is detected by the flip-flop circuit 28 and the smoothing circuit 29.

Also in the case of more than four sets of induction lines being laid, the same principle as described in the above example works and the object of the present invention can be attained, but in this case the induction lines are arranged such that the nodal point on one of the $n-1$ sets of induction lines are staggered by $(n-1)/l/n$ ($l$ is the inter-nodal distance) in the travel direction of vehicle, from the corresponding nodal point on the next induction line. The nodal point on the third induction line is staggered by $(n-1)/l/n$ more from the corresponding nodal point on the second induction line and in this fashion the nodal point on one induction line is staggered by $(n-1)/l/n$ from the corresponding nodal point on the next induction line in the travel direction of vehicle. The phase of the induced voltage in the induction line R is not shifted, but the induced voltages in the other induction lines are phase-shifted $(n-1)$ times plus and minus with a difference of $180°$ $(n-1)/n$ from the induced voltage in said induction line R, such as $180°$ $(n-1)/(/n$, $180°$ $(n-)/n$ + $180°(n-1)/n$, $180°(n-1)/n$ + $180°(n-1)/n$ + $180°$ $(n-1/n;$ then $(n-1)$ voltages thus minus phase-shifted and the voltage of the induction line R, or $(n-1)$ voltages thus plus phase-shifted and the voltage of the induction line R are respectively added together; and the phase difference between these waves is measured.

FIG. 6 illustrates a third embodiment of the present invention. The feature of this embodiment lies in that, unlike the preceding embodiments where the signal phase-shifted by the phase-shifter is a signal from a on-board transmitter, in the present embodiment a signal from a wayside oscillator is used.

Thus the principle in the present embodiment is that the induced voltage of each induction line is rectified to dc and the output of a oscillator which oscillates a specific frequency is modulated by the dc. Then the signals except one are respectively phase-shifted and, the voltages thus phase-shifted and voltage non-phase-shifted are added together. By detecting the phase difference between the wave thus obtained and the output of the oscillator, the momentary position of the vehicle is determined.

Figure 6A:
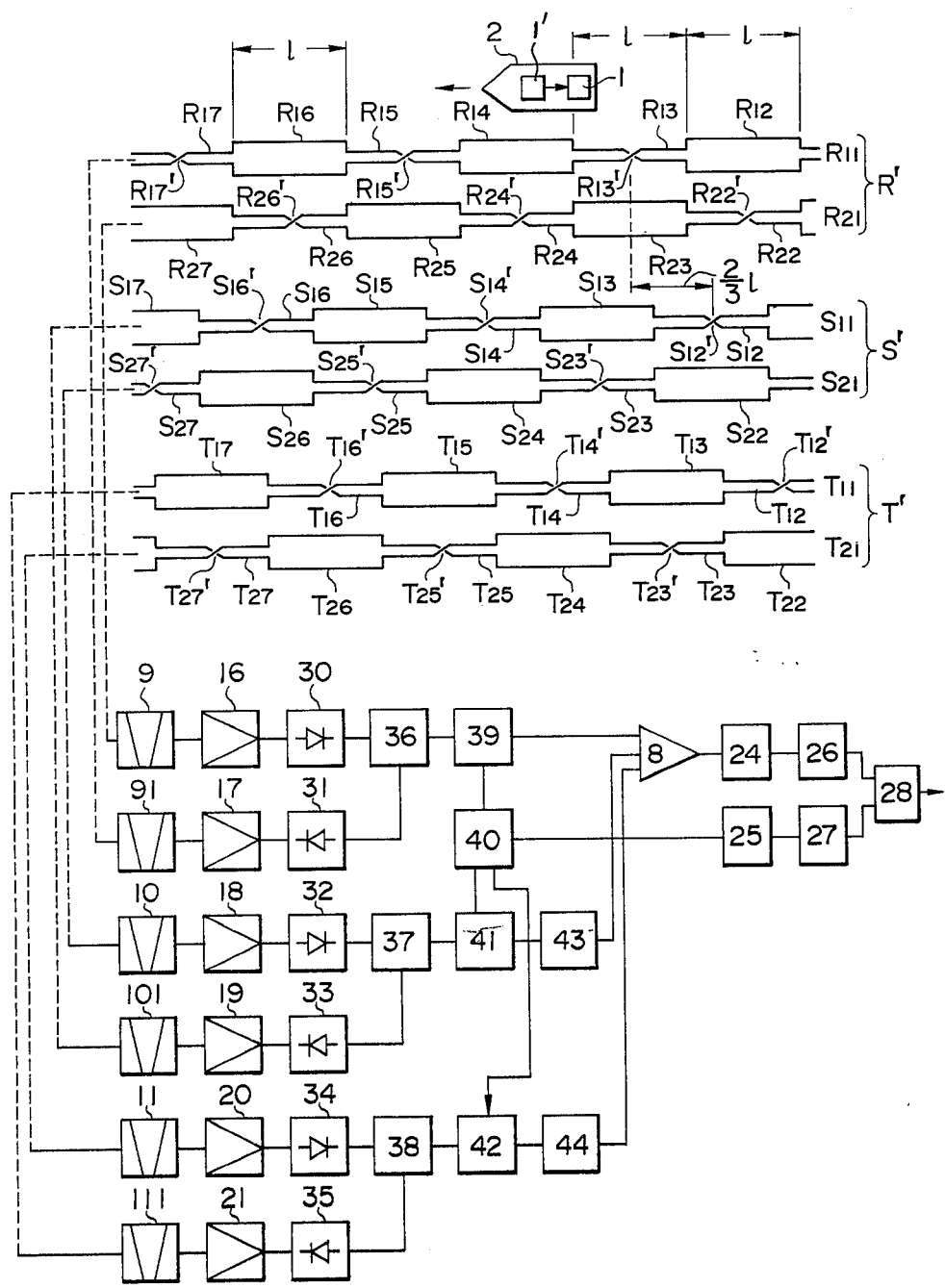
FIG. 6(a) shows the whole circuit of still another embodiment of the present invention.

In FIG 6(a) two induction lines, composed of loop channels with widely separated parallel portions and with narrowly separated parallel portions alternately connected, are combined as a set. The lengths, in the travel direction vehicle, of the wide parallel portion and narrow parallel portion are the same, each being equal to $l$. In one loop channel $R_{11}$, which comprises the induction line R', the wide parallel portion, say, $R_{12}$, is disposed opposite to the narrow parallel portion, say, $R_{22}$. the central points $R_{13}'$, $R_{15}'$, $R_{17}'$, $R_{24}'$ and $R_{26}'$, in the travel direction of vehicle on the narrow parallel portions $R_{13}$, $R_{15}$, $R_{17}$, $R_{22}$, $R_{24}$, and $R_{26}$ are nodal points of transposition. The distance between a nodal point, say, $R_{13}'$, on one loop $R_{11}$ cosistuting one induction line R' and a nodal point, say, $R_{22}'$ adjacent to said nodal point $R_{13}'$ in the travel direction of vehicle on other loop $R_{21}$ is $l$. The induction lines S' and T' are the same. In FIG. 6(a), $S_{13}$, $S_{15}$, $S_{17}$, $S_{22}$, $S_{24}$, $S_{26}$, $T_{13}$, $T_{15}$, $T_{17}$, $T_{22}$, $T_{24}$, $T_{26}$, are wide parallel portions; $S_{12}$, $S_{14}$, $S_{16}$, $S_{23}$, $S_{25}$, $S_{27}$; $T_{12}$, $T_{14}$, $T_{16}$, $T_{23}$, $T_{27}$, are narrow parallel portions; and $R_{13}'$, $R_{15}'$, $R_{17}'$, $R_{22}'$, $R_{24}'$, $R_{26}'$; $S_{12}'$, $S_{12}'$, $S_{14}'$, $S_{16}'$, $S_{23}'$, $S_{25}'$, $S_{27}'$; $T_{12}'$, $T_{14}'$, $T_{16}'$, $T_{23}'$, $T_{25}'$, $T_{27}'$ are respectively nodal points.

The nodal point, say, $S_{12}$ on the loop channel $S_{11}$ is staggered by $\frac{2}{3}l$ from the nodal point $R_{13}'$ on the loop channel $R_{11}$ in the travel direction of vehicle, while the nodal point $T_{12}'$ on the loop channel $T_{11}$ is staggered by $\frac{2}{3}l$ more from the nodal point $S_{12}'$ on the loop channel $S_{11}$ in the travel direction of vehicle.

Figure 6B:
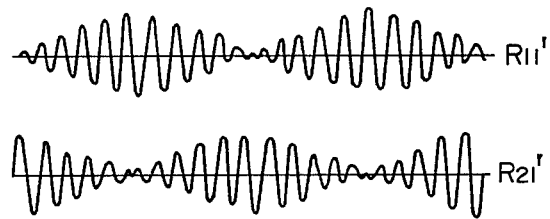
FIGS. 6(b) to (m) are waveform patterns explaining the function of the embodiment illustrated in FIG. 6(a).
Figure 6C:
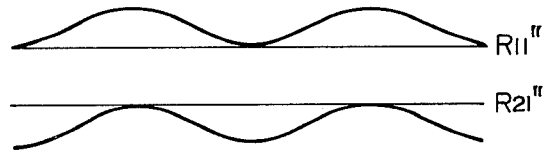
Figure 6D:
Figure 6E:
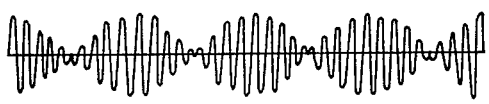

Suppose the vehicle 2 is moving in the arrow direction in this arrangement. Then with the antenna movement accompanying the progress of the vehicle 2, induced voltages $R_{11}'$, $R_{21}'$, as shown in FIG. 6(b) develop in the loop channels $R_{11}$, $R_{21}$ and only these voltages are filtered in the bandpass filters 9 and 91. They are then amplified in the amplifiers 16 and 17, after which they are rectified in the rectifiers 30 and 31. The outputs $R_{11}''$, $R_{12}''$ in FIG. 6(c) are applied to the add circuit 36. In the add circuit 36, $R_{11}''$, $R_{12}''$ indicated FIG. 6(c) are added together with reversed polarity to each other and the synthetic wave thus obtained as shown in FIG. 6(d) is applied to the balanced modulation circuit 39. Thereby ac output from the frequency oscillator 40 is applied as a modulated wave as shown in FIG. 6(e) to the add circuit 8.

Figure 6F:
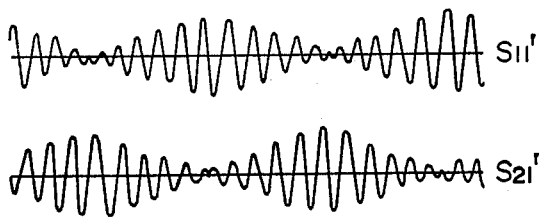
Figure 6G:
Figure 6H:
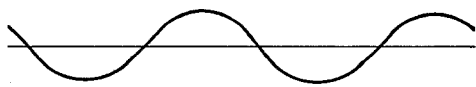
Figure 6I:
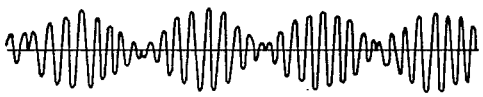
Figure 6J:
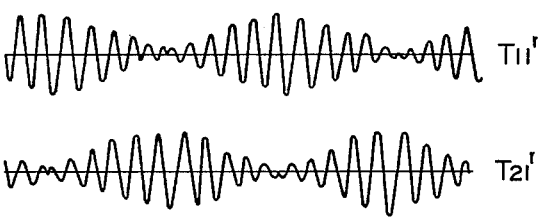
Figure 6K:
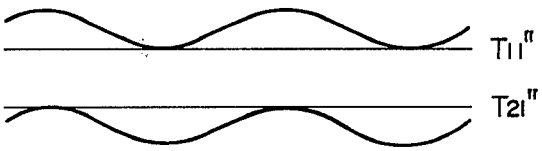
Figure 6L:
Figure 6M:

Similarly in the loop channels $S_{11}$ and $S_{21}$ voltages as denoted by $S_{11}'$, $S_{21}'$ in FIG. 6(f) are induced and only these voltages are filtered in the bandpass filters 10, 101. Thereafter these voltages are amplified in the amplifiers 18 and 19 and are rectified in the rectifiers 32, 33 producing the dc outputs $S_{11}''$, $S_{21}''$. In add circuit 37 $S_{11}''$, $S_{21}''$ are added together as shown in FIG. 6(h) and the syynthetic wave thus obtained is applied to the balanced modulation circuit 41. Meanwhile, an ac signal with a specific frequency is applied from the frequency oscillator 40 to the balanced modulation circuit 41. By the synthetic wave thus obtained, an ac output of the oscillator 40 with the specifice frequency is modulated to a wave as shown in FIG. 6(i); then phase-shifted by +120° in the phase-shifter 43; and thereafter applied to the addcircuit 8. In the same way, only the induced voltages $T_{11}'$, $T_{21}'$ in FIG. 6(j) of the loop channels $T_{11}'$ $T_{21}'$ are filtered in the bandpass filters 11, 111 and then respectively amplified in the amplifiers 20, 21; rectified in the rectifiers 34, 35 to produce the dc outputs $T_{11}''$, $T_{21}''$ in FIG. 6(k), in add circuit 38, these are synthesized as illustrated in FIG. 6(l), and the synthetic wave thus obtained is applied to the balanced modulation circuit 42. By the synthetic wave thus obtained, an ac output of the oscillator with a specific frequency is modulated to a wave as shown in FIG. 6(m); phase-shifted by +240° in the phase-shifter 44; and then applied to the add circuit 8. Then in the add circuit 8 the non-phase-shifted ac voltage originating from the induction line R', the ±120° phase-shifted ac voltage originating from the induction line S', and the +240° phase-shifted ac voltage originating from the induction line T are added together, therefore, if the inter-nodal distance $l$ of the induction line in FIG. 6(a) is equal to the inter-nodal distance $l$ of the induction line in FIG 3(a), a synthetic output approximated by FIG. 3(i) will be applied from the add circuit 8 to the rectangular wave reforming circuit 24. Meanwhile, the ac output of the frequency oscillator 40 is applied to the rectangular wave shaping circuit 25. After this, in just the same way as shown in FIG 3(k)–(q), the phase difference between the synthetic wave output of the add circuit 8 and the ac wave output of the oscillator 40 is detected.

In FIG. 3(q) however, at every interval equal to the inter-nodal distance $l$, the phase difference between V$a$ and V$b$ shift by 360° and accordingly, the voltage curve V$\theta'$ is obtainable for every distance $l$. In the embodiment of FIG 6(a), there is no phase-shift in the ac output of the osillator 40 and accordingly the phase difference between the synthetic wave output of the add circuit 8 and ac output of the osillator 40 changes 360° for every distance $2l$. Thus, except the difference that for every distance $2l$ a voltage curve corresponding to the voltage curve v$\theta'$ is obtainable, it is the same as in FIG. 3(q) that the instanteneous position of a vehicle can be detected by measuring the voltage in said voltage curve.

In the embodiments illustrated in FIGS. 3 and 5 the induced voltages of all induction lines except one are, in the as-received state of ac, shifted in phase as specified; and then the induced voltage of the unshifted induction line and the plus-shifted induced voltages, or the induced voltage of the unshifted voltages and the minus shifted induced voltage are added together. By detecting the phase difference between the two synthetic waves the vehicle position is known. By contrast, in the embodiment illustrated in FIG. 6, the induced voltage of all induction lines are rectified to dc and modulated by a specified frequency output from a separate modulator. All the modulated waves except one are phase-shifted as specified. Thereby, each modulated wave, is not phase-shifted in both the plus and the minus, but phase-shifted in either the plus or the minus direction. Thereafter the non-phase-shifted modulated wave and the phase-shifted modulated wave are synthesized and the vehicle position is known by detecting the phase difference between said synthetic wave and the output of the oscillator.

Strictly speaking in the embodiment of FIG. 3, where the phase of the received voltage is utilized to detect the position of the vehicle, the transmission characteristic of the induction line is likely to be affected in the induction lines laid over a long distance.

By contrast in the embodiment illustrated in FIG. 6 the induced voltages are converted to dc; then an ac output of a separately provided oscillator is modulated; and thereafter, the phase difference between the phase-shifted synthetic modulated wave and the output of the oscillator is detected. Therefore, the transmission characteristics of the induction line exerts a negligible influence. Another advantage of this embodiment lies in that the phase shift on the induced voltage has only to be either plus or minus.

FIG. 7 illustrates a fourth embodiment of the present invention, which is a case of two induction lines being laid in the example of FIG. 6.

Figure 7A:
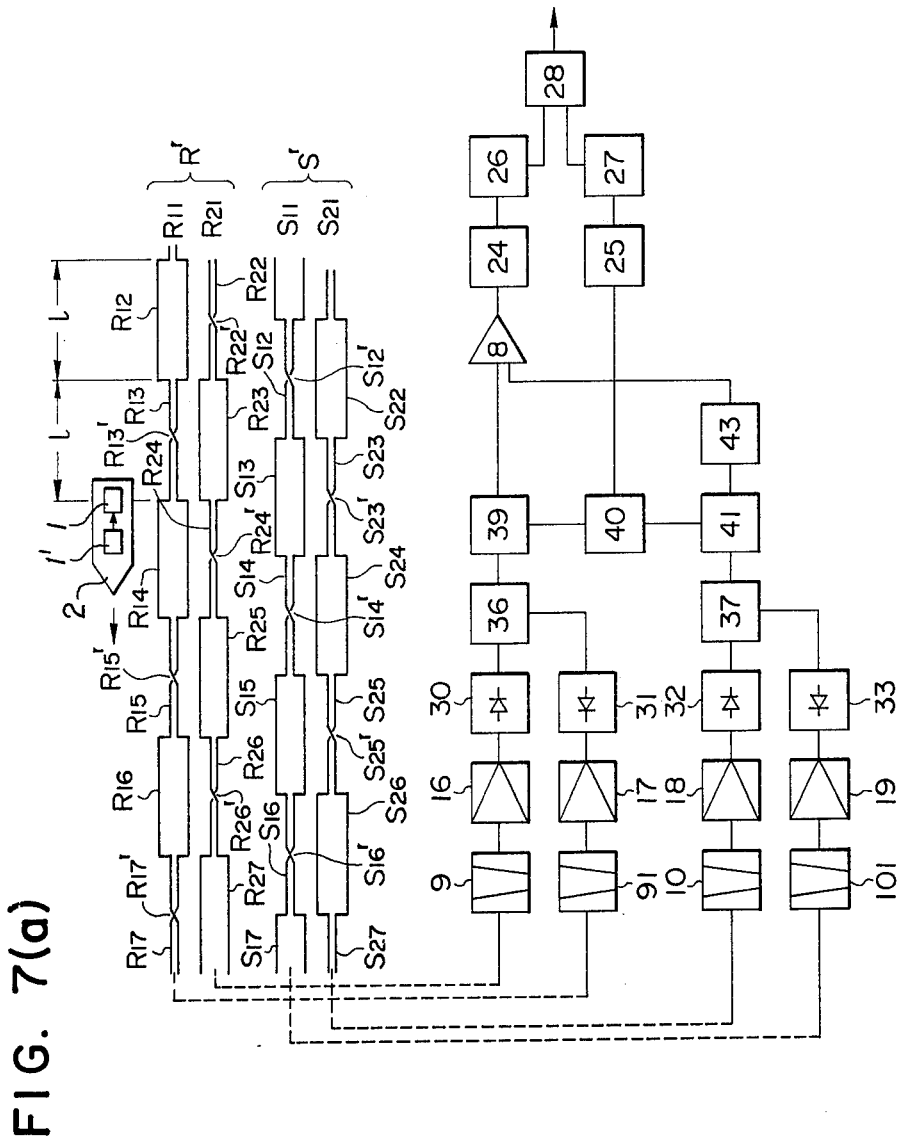
FIG. 7(a) shows the whole circuit of a fourth embodiment of the present invention.

In FIG. 7(a) the arrangement of the induction lines, and the inter-nodal distance on the induction line are the same as in FIG. 6. The staggering of nodal points is $\frac{1}{2}l$. The same elements are denoted by the same symbols in FIGS. 6 and 7.

Figure 7B:
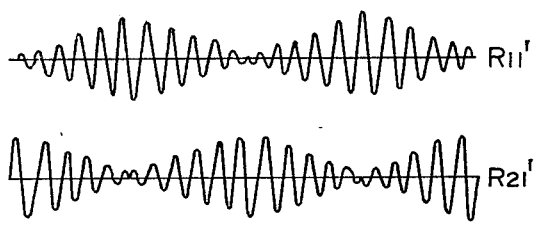
FIGS. 7(b) to (i) are wave form patterns explaining the function of the embodiment illustrated in FIG. 7(a).
Figure 7C:
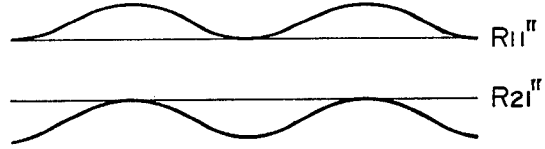
Figure 7D:
Figure 7E:
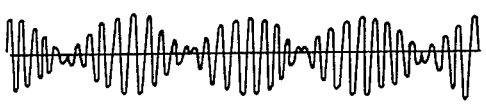
Figure 7F:
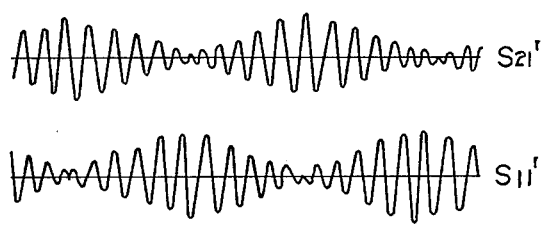
Figure 7G:
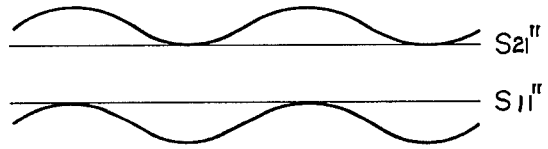
Figure 7H:
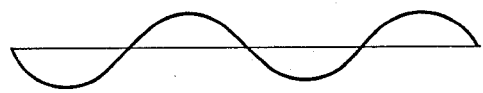

In this arrangement, with the antenna movement in the arrow direction with the progress of the vehicle 2, the voltage $R_{11}'$, $R_{21}'$ as indicated in FIG. 7(b) are induced in the loop channels $R_{11}$, $R_{21}$; and in the bandpass filters 9, 91 only these induced voltages are filtered, the filtered signals then amplified in the amplifiers 16, 17, rectified in the rectifiers 30, 31; and thereafter the outputs $R_{11}''$, $R_{21}''$ in FIG. 7(c) are given to the add circuit 36. The dc output $R_{11}''$, $R_{21}''$ of FIG. 7(c) are added together in said add circuit 36 and a synthetic wave as indicated in FIG. 7(d) is applied to the balanced modulation circuit 39. An ac output with a specific frequency is then applied by the oscillator 40 to the balanced modulation circuit 39 and thereby an output of the frequency osillatoer 40 is applied as a modulated wave of FIG. 7(e) to the add circuit 8. Likewise, in the loop channels $S_{11}$, $S_2$, the voltages indicated by $S_{11}'$, $S_{21}'$, in FIG. 7(f) are induced; and the bandpass filters 10, 101, only these induced voltages are filtered; amplified in the amplifiers 18, 19 rectified in the rectifiers 32, 33 to produce dc outputs indicated as $S_{11}''$, $S_{21}''$ in FIG. 7(g). In add circuit 37 these dc outputs $S_{11}''$, $S_{21}''$ are synthesized as shown in FIG. 7(h); the synthetic wave as indicated in FIG. 7(h) is applied to the balanced modulation circuit 41.

Figure 7I:

By the synthetic wave thus obtained the ac output of the osillator 40 is modulated to a wave as illustrated in FIG. 7(i), phase-shifted by +90° in the phase-shifter 43; and then applied to the add circuit 8. Thus in the add circuit 8, a modulated wave of the non-phase-shifted ac voltage originating from the induction line R' and the +90° phase-shifted ac voltage originating from the induction lines S' are added together to produce a synthetic wave as shown in FIG. 5(f) and this synthetic wave is applied through the rectangular wave shaping circuit 24 and the rise detection circuit 26 to the fip-flop circuit 28. Meanwhile, an ac output with a specified frequency of the frequency osillator 40 is applied through the rectangular wave reforming circuit 25 and the rise detection circuit 27 to the fip-flop circuit. Thus by the same principal as described referring to FIG. 6, the fip-flop circuit 28 detects the phase difference between said synthetic modulated wave and the output from the osillator 40 and therefrom the train position can be continuously detected.

When more than four sets of induction lines are laid, the object of the present invention can be attained by the same principle as described referring to FIGS. 6 and 7 but in this case the induction lines are disposed such as the nodal point on one of the $n$-sets of induction lines is staggered by $(n-1)l/n$ ($l$ is the distance between a nodal point on one loop constituting one induction line and a nodal point adjacent to said nodal point in the travel direction of vehicle on the other loop) from the corresponding nodal point on the next induction line in the travel direction of the vehicle. The nodal point on the third induction line is staggered by $(n-1)/n\ l$ more from the corresponding nodal point on the second induction line; and in this fashion the nodal point on all induction lines are successively staggered by $(n-1)l/n$ in the travel direction of the vehicle. The phase of the modulated wave of the induced voltage in the induction line R' is not shifted, but the modulated wave originating from the other induction lines are either plus-shifted or minus shifted from the modulated wave originating from the induction line R', $(n-1)$ times with a difference of 180° $(n-1)/n$ such as 180° $(n-1)/n$, 180° $(n-1)/n$ + 180° $(n-1)/n$, 180° $(n-1)/n$ + 180° $n-1/n$ + 180° $(n-1)/n$. The $(n-1)$ modulated waves, thus either plus-shifted or minus shifted in phase and the modulated wave in the induced voltage R' are synthesized and by measuring the phase difference between the synthetic wave and the output of the frequency oscillator, the vehicle position can be continuously detected.

In the embodiments illustrated in FIGS. 6 and 7 a set of loop channels with an alternate wide parallel portion and narrow parallel portion are combined.

Adoption of induction lines of such a construction is desirable for converting the induced voltage of the induction line to dc as in the embodiments of FIGS. 6 and 7, because it gives an accurage sine wave output with the distance between two adjoining nodal points as one cycle. The same result will be produced for instance by adoption of loop channels as illustrated in FIGS. 3 and 4 which have equi-spaced nodal points and the same length of parallel portions.

It is apparent from the above that when the on-board antenna can move over the induction line and parallel to the induction line and when the separation of the antenna from the induction line and the inter-nodal distance on the induction line are properly set according to the present invention, a sine wave voltage with the distance between two adjoining nodal points as one cycle is induced with the antenna movement and utilizing this induced voltage, the detection of vehicle position can be made continuously.

In the conventional system which is a discontinuous detection of nodal points, there is a practical limitation to the possibility of increasing the accuracy of detection by minimizing the inter-nodal distance. According to the present invention the train position at every moment can be successively detected; thus without minimizing the inter-nodal distance, the accuracy can be increased easily. Thus, in the case of adopting a frequency of 100 KHZ for the signal to be transmitted through the on-board antenna, it has been confirmed, the train position can be detected with an area of several centimeters for an inter-nodal distance of several meters.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A method of continuously detecting the position of a vehicle wherein the vehicle includes means for transmitting a magnetic field of a predetermining frequency and amplitude; and the vehicle travels parallel to a plurality of induction lines, wherein the number of induction lines equals n, each induction line having a plurality of nodal points of transposition, the inter-nodal distance being the same between all the nodal points on all of the induction lines, wherein the nodal points in each induction line are staggered with respect to the nodal points on adjacent induction lines by a distance of $(n-1)/n$ (the distance between nodes), said method comprising the steps of transmitting a signal from the vehicle to the induction lines and thereby inducing a sine wave voltage in each of the induction lines; successively phase shifting said induced signal in each of the induction lines except one by an amount equal to 180° $(n-1)/n$ in both the positive and negative direction; adding all of said positively shifted signals and said non-shifted signal; adding all of said negatively shifted signals and said non-shifted signals; comparing the phase difference of said added signals, the phase difference being indicative of the position of the vehicle.

2. The method of claim 1, wherein the wavelength of said transmitted signal is twice the distance between nodes.

3. A method of continuously detecting the position of a vehicle wherein the vehicle includes means for transmitting a magnetic field of a predetermined frequency and amplitude; and the vehicle travels parallel to a plurality of pairs of induction lines, wherein the number of pairs of induction lines equals $n$, each induction line having a plurality of nodal points of transposition, the inter-nodal distance being the same between all the nodal points on all of the induction lines, wherein the nodal points in each pair of induction lines are staggered with respect to the nodal points on adjacent pairs of induction lines by a distance of $(n-1)/n$ (the distance between nodes), said method comprising the steps of transmitting a signal from the vehicle to the pairs of induction lines and thereby inducing a sine wave voltage in each of the induction lines; rectifying and adding said induced voltages in each pair of induction lines; generating an ac signal; separately modulating said ac signal with each of said rectified added signals; successively phase-shifting each of said modulated signals except one by $180°$ $(n/n-1)$; adding said phase shifted and non-shifted signal; comparing the phase of said added signals to said ac signal, the difference being indicative of the position of the vehicle.

4. The method of claim 3, wherein said modulated signal may be phase shifted in either the positive or negative direction.

* * * * *